Figure 1:
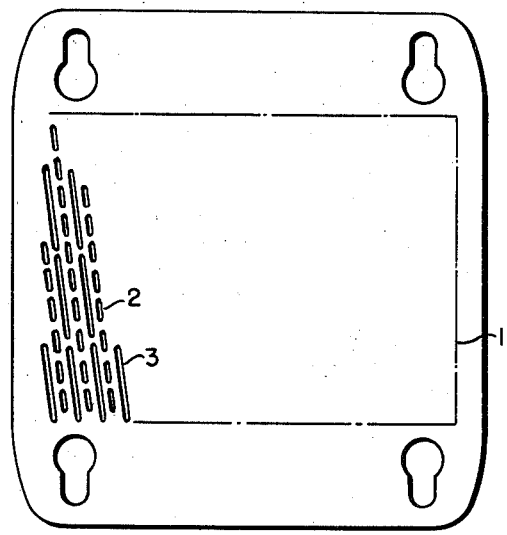

Dec. 24, 1957 A. BRAUN 2,817,145

SHEAR PLATE FOR DRY SHAVERS

Filed June 8, 1954

INVENTOR.
ARTUR BRAUN

BY

ATTORNEYS

United States Patent Office 2,817,145
Patented Dec. 24, 1957

2,817,145
SHEAR PLATE FOR DRY SHAVERS

Artur Braun, Frankfurt am Main, Germany, assignor to Max Braun, a partnership consisting of Erwin Braun and Artur Braun Application June 8, 1954, Serial No. 435,320

1 Claim. (Cl. 30—43)

The present invention relates to the construction of shear plates employed in the shaving heads of dry shavers.

A shear plate generally consists of a thin metal sheet having slots or perforations defining shearing edges, and forms the outer stationary cutting member of the shaver. A reciprocating cutter formed with shearing edges contacting the inner surface of the shear plate constitutes the inner cutting member cooperating with the shear plate. The shear plate and cooperating cutter comprise the shaving head which is generally mounted on a body member containing a driving unit operating the inner cutter. Shaving is accomplished by passing the shear plate over the surface of the skin so that the hair enters the perforations in the shear plate and is severed by the cutter at the inner edges of the perforations.

A satisfactory shear plate is desirably of sufficient strength and rigidity to assure proper contact of its shearing edges with those of the cutter, and is also desirably as thin as possible to give maximum closeness of shave. In addition, the slots should be of such length and width that the hair readily enters them while the skin is held back to avoid nipping at the cutting edges, and should also provide a maximum length of shear edges within the limitations of plate thickness and necessary strength and rigidity.

The present invention provides a shear plate which may be easily and inexpensively formed with these desirable characteristics.

The shear plate of this invention in general comprises a thin hard resilient metal sheet having elongated slots defined by arcuate segments intersecting to form spaced indentations of appreciable depth; and preferably having their centers of curvature substantially at the center line of the slot with the segments on one side of the slot opposed to corresponding segments on the other side. The slots are desirably arranged in semi-diagonal rows forming an acute angle with the shear edges of the inner cutter, with rows of long slots alternating with rows of short slots, and with the spaces between the ends of adjacent slots in each row staggered with the spaces between the ends of adjacent slots in the adjacent rows so that a slot or part of a slot lies in the row beside each space.

This construction provides a number of important advantages in permitting the slots to be of greater maximum width, facilitating the entry of hair, while by means of the periodic indentations, the skin is held back. In addition, the indentations provide a combing action further assuring engagement of the hairs in the slots; and the arcuately shaped sides of the slots increase greatly the length of shearing edges with respect to total slot length. A further advantage lies in the fact that the distance between adjacent rows of slots may be decreased within the strength and rigidity limitations of the shear plate, since the strips of the plate between adjacent rows of slots are periodically widened at the indentations resulting in periodic regions of increased rigidity. A greater length of slots may thus be provided in the shear plate.

Figure 2:
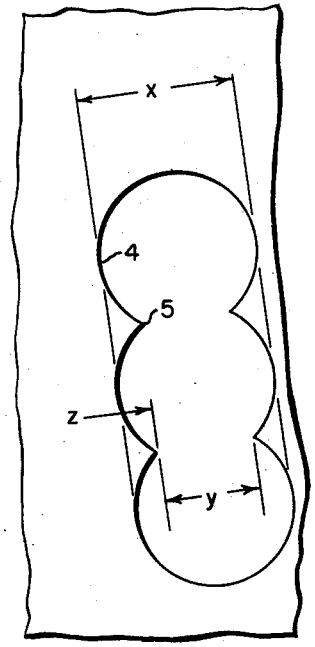
Figure 3:

The preferred embodiment of this invention, selected for purposes of illustration, is described in detail below, reference being made to the accompanying drawings in which:

Fig. 1 is a plan view of a shear plate showing diagrammatically the arrangement of the slots, and Fig. 2 is an enlarged fragmentary view of a shear plate showing the slot construction in detail, and Fig. 3 is a perspective view of the shaver head with the shear plate broken away to reveal the cutter.

The shear plate herein described is formed as a normally flat thin resilient metal plate 1 adapted to be bowed and held in the shearing head of a dry shaver in contact with the cutter, in the type of shaver construction described in detail in copending application, Serial No. 403,348 filed January 11, 1954.

The plate 1 having a thickness generally between 0.03 and 0.10 millimeter, preferably about 0.06 millimeter, is formed with parallel rows of short slots 2 alternating with rows of long slots 3, each row forming an acute angle with the longitudinal center line of the plate 1 and with the shearing edges 6 of the cutter 7, whereby the cutter edges can traverse the slots progressively from one end to the other. As shown in Fig. 1, the short slots 2 are about ⅓ the length of the long slots, and are so aligned that the area between the ends of adjacent long slots 3 in each row lies between short slots 2 in the rows on either side.

The slots 2 and 3, as shown in Fig. 1, are formed as shown in Fig. 2 with edges defined by intersecting arcs 4 providing indentations 5 of substantial depth at the points of intersection, with each arc having its center of curvature in the center line of the slot and with the arc section at each edge opposed to an arc section on the opposite edge. Thus, each slot has a maximum breadth $x$ which is periodically reduced at the indentations 5 to a breadth $y$. The minimum slot breadth $y$ should, of course, be wide enough to permit hairs to enter the slots, and the maximum breadth $x$ should not be so large as to permit the skin to be engaged at the cutting edges. In shear plates of this invention, the breadth $x$ may, however, because of the periodic reductions to breadth $y$ at the indentations 5, be considerably greater than if periodic indentations were not present. In general, the maximum breadth $x$ is conveniently between 1.2 and 2.0 times the breadth $y$, which may be provided by forming each arc to subtend an angle of between about 70 and 120 degrees.

A shear plate of this type can easily be made by a stamping operation employing a simple circular punch.

It will be readily seen that by forming the slots with periodic opposed indentations, as described above, the length of shearing edges is increased, and larger slots may be formed without danger of nipping the skin. In addition, the indentations not only impart a combing action assisting entry of the hairs through the slots, but also periodically enlarge the inter-slot structure of the shear plate, as indicated at $z$, permitting the rows of slots to be spaced closely together. It will also be seen that by staggering the slots in alternating rows, long slots suited for the shaving of long hairs, as well as short slots, may be provided without seriously weakening the plate.

It will be understood that the foregoing example has been selected for purposes of illustration and that modifications readily occurring to men skilled in the art may be made without departing from the scope of the invention.

Having thus disclosed my invention and described in detail a preferred embodiment thereof, I claim and desire to secure by Letters Patent:

In a dry shaver having a reciprocating cutter formed with a plurality of blades having transverse shearing edges: a shear plate cooperating with said cutter comprising a thin sheet having a plurality of slots, the edges of said slots defined by intersecting arcuate segments having their centers of curvature at the center line of the slot with each arcuate segment opposite an arcuate segment having the same center, the intersections of said segments being in the form of sharp pointed indentations imparting a combing structure to said slots with said slots arranged in parallel rows each forming an acute angle with the shearing edges of the cutter.

References Cited in the file of this patent

UNITED STATES PATENTS

| | | |
|---|---|---|
| 2,261,660 | Rand et al. | Nov. 4, 1941 |
| 2,292,858 | Alexay | Aug. 11, 1942 |
| 2,306,172 | Lindholm | Dec. 22, 1942 |
| 2,363,849 | Bailey | Nov. 28, 1944 |